(12) United States Patent
Zhuang

(10) Patent No.: US 6,804,106 B2
(45) Date of Patent: Oct. 12, 2004

(54) METHOD AND APPARATUS FOR A LIGHTNING PROTECTION USING VACUUM PLASMA

(76) Inventor: Hongchun Zhuang, P.O. Box 8701, Beijing (CN), 100080

( * ) Notice: Subject to any disclaimer, the term of this patent is extended or adjusted under 35 U.S.C. 154(b) by 62 days.

(21) Appl. No.: 10/187,453

(22) Filed: Jun. 28, 2002

(65) Prior Publication Data

US 2003/0103311 A1 Jun. 5, 2003

Related U.S. Application Data

(63) Continuation of application No. PCT/CN00/00236, filed on Aug. 8, 2000.

(51) Int. Cl.$^7$ ............................................. H01T 23/00
(52) U.S. Cl. ......................................... 361/230; 174/2
(58) Field of Search ................................ 361/111, 112, 361/117, 120, 212, 213, 216, 220, 225, 229, 230, 231, 232; 455/562.1, 575.5, 575.8; 343/701, 720; 174/2

(56) References Cited

U.S. PATENT DOCUMENTS

| | | | |
|---|---|---|---|
| 3,989,984 A | 11/1976 | Amason et al. ................. 317/2 |
| 4,448,838 A | 5/1984 | McClenahan et al. ...... 428/251 |
| 4,755,904 A | 7/1988 | Brick .......................... 361/117 |
| 5,694,286 A | * 12/1997 | Fowler et al. ............... 361/220 |
| 5,987,335 A | * 11/1999 | Knoedl, Jr. et al. ......... 455/561 |

FOREIGN PATENT DOCUMENTS

| | | | |
|---|---|---|---|
| CN | 2049415 | 12/1989 | ........... H01T/23/00 |
| CN | 1139304 | 1/1997 | ........... H01T/23/00 |

* cited by examiner

*Primary Examiner*—Ronald Leja
(74) *Attorney, Agent, or Firm*—Knobbe Martens Olson & Bear LLP

(57) ABSTRACT

The present invention relates to lightning protection, and in particular, to lightning protection using vacuum plasma. The lightning protection of the present invention impairs an electric field created by an atmospheric condition, such as a charged cloud, by polarizing vacuum plasma that is under the effect of the electric field. The polarized plasma neutralizes or diminishes the electric field in the proximity of a protected object and thus prevents the electric field from reaching a sufficient level where the air near the protected object fails to act as an insulator. In this way, the lightning strike is prevented from hitting an object surrounded by or in close proximity to the plasma.

6 Claims, 1 Drawing Sheet

METHOD AND APPARATUS FOR A LIGHTNING PROTECTION USING VACUUM PLASMA

RELATED APPLICATIONS

This application is a continuation of PCT Application No. PCT/CN00/00236 filed on Aug. 8, 2000 and takes the benefit of the earlier filing date under 35 U.S.C. §§ 120 and 365(c); the international application was published in a non-English language.

BACKGROUND OF THE INVENTION

1. Field of the Invention

The present invention relates to lightning protection, and in particular, to lightning protection using vacuum plasma.

2. Description of the Related Technology

In the conventional lightning protection technology, a lightning rod is mounted on top of an object to attract a lightning strike and conduct the resulting lightning current to the ground. This protects objects within a certain distance of the lightning rod from being struck. If a lightning strike occurs, however, the lightning current radiates an electromagnetic pulse as it travels to the ground. This electromagnetic pulse may disturb an electronic device depending on the proximity to the lightning strike. For example, devices within 1000 meters may be disturbed, devices within 500 meters may be effected, and devices within 100 meters may be destroyed. Therefore, a lightning rod cannot effectively protect modern microelectronic devices from damage caused by a lightning strike.

SUMMARY OF CERTAIN INVENTIVE ASPECTS

One aspect of this inventions is a method of providing lightning protection, comprising polarizing vacuum plasma under the influence of an induced electric field to diminish or neutralize an electric field produced by an induced condition.

Another aspect of this invention is an apparatus for lightning protection using vacuum plasma, comprising a holder of plasma, wherein the holder of plasma is made of an insulating material with a substantially smooth inner surface and having a rather large curvature radius, a conductor positioned proximate to or on a surface of the holder of plasma, a circuit, wherein the circuit connects to the conductor so as to generate a plasma, a conducting wire connecting the conductor to a protected object, and a power supply connected to the circuit.

Yet another aspect of this invention is a holder of plasma, wherein the holder of plasma is made of an insulating material with a substantially smooth inner surface and having a rather large curvature radius, a conductor positioned proximate to or on a surface of the holder of plasma, a circuit, wherein the circuit connects to the conductor so as to generate a plasma, a conducting wire connecting the conductor to a protected object, a power supply connected to the circuit, and an amplifier connected in series between the holder of plasma and the protected object.

Yet another aspect of this invention is a holder of plasma, wherein the holder of plasma is made of an insulating material with a substantially smooth inner surface and having a rather large curvature radius, a conductor positioned proximate to or on a surface of the holder of plasma, a circuit, wherein the circuit connects to the conductor so as to generate a plasma, a conducting wire connecting the conductor to a protected object, a power supply connected to the circuit, and a high speed electrical current amplifier connected in series between the holder of plasma and the protected object.

Yet another aspect of this invention is a holder of plasma, wherein the holder of plasma is made of an insulating material with a substantially smooth inner surface and having a rather large curvature radius, a metal conductor positioned proximate to or on a surface of the holder of plasma, a circuit, wherein the circuit connects to the conductor so as to generate a plasma, a conducting wire connecting the conductor to a protected object, and a power supply connected to the circuit.

Yet another aspect of this invention is a system for providing lightning protection, comprising means for polarizing vacuum plasma under the influence of an induced electric field to diminish or neutralize an electric field produced by an induced condition.

BRIEF DESCRIPTION OF THE DRAWINGS

The above-mentioned and other features and advantages of the invention will become more fully apparent from the following detailed description, the appended claims, and in connection with the accompanying drawings in which:

DETAILED DESCRIPTION OF THE CERTAIN INVENTIVE EMBODIMENTS

Embodiments of the invention will now be described with reference to the accompanying figures, wherein like numerals refer to like elements throughout, although the like elements may be positioned differently or have different characteristics in different embodiments. The terminology used in this description is not intended to be interpreted in any limited or restrictive manner, simply because it is being utilized in conjunction with a detailed description of certain specific embodiments of the invention. Furthermore, embodiments of the invention may include various features, no single one of which is solely responsible for its desirable attributes or which is essential to practicing the invention.

The present invention relates to improvements in lightning protection technology, particularly pertaining to using plasma to avoid a direct lightning strike. Before a lightning strike, an atmospheric condition occurs where a charge separation forms within a cloud of water vapor so that the base of the cloud has primarily a negative charge. The negative charge at the base of the cloud causes a charge similar but opposite in polarity to form at the earth's surface under the cloud. If the charge differential between the base of the cloud and the earth's surface increases sufficiently so that the air is no longer able to act as an insulator, the charge acts to neutralize itself by forming a step leader, a low intensity spark that moves from the negatively charge cloud to the positively charged earth. The step leader initiates a lightning strike, approaching the earth somewhat randomly until, just above the earth, it seeks an object to strike. The object the step leader strikes will be the one with the highest concentration of opposite charge, i.e., the object with the largest charge differential from the step leader.

Plasma is a gas consisting of ions, electrons, and neutral particles. The behavior of the plasma gas is dominated by the electromagnetic interaction between the charged particles.

When plasma is in an area influenced by a charged cloud, the positive and negative charged particles in plasma will drift in opposite directions under influence of the electric field produced by the charged cloud. This generates a polarized electric field which neutralizes or diminishes the electric field produced by the charged cloud and can prevent the electric field from reaching a sufficient level where the air cannot act as an insulator. In this way, the lightning strike is prevented from hitting an object surrounded by or in close proximity to the plasma.

Figure 1:
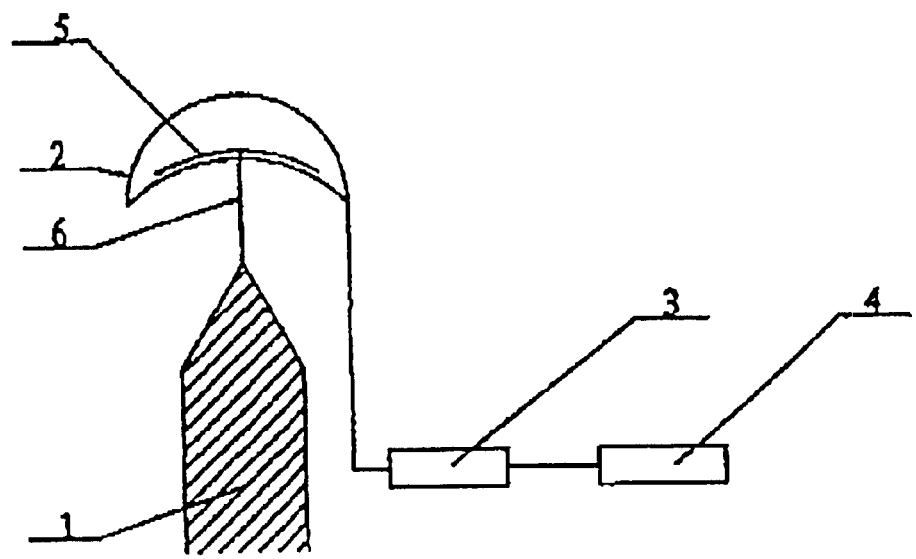
FIG. 1 is block diagram of a lightning protection system, according to one embodiment of the invention.

FIG. 1 shows a diagram of an apparatus that can provide lightning protection using plasma, according to one embodiment of the invention. In the apparatus, a power supply 4 provides power to a circuit 3 that generates plasma by ionizing the air in a vacuum plasma holder 2. The plasma holder 2 is formed from an insulating material that has a smooth inner surface and a rather large curvature radius, and in which there is located a conductor 5. The conductor 5 is connected to a protected object 1 by a conducting wire 6. Circuit 3 generates a vacuum plasma with a sufficient density of charged particles to protect the object 1. The outer surface of the holder 2 may or may not cover the protected object 1. In certain embodiments, the conductor 5 inside the holder 2 is connected by a conducting wire 6 to a position on the protected object 1 that possesses the highest electric charge induced by an electrical field. When the plasma is polarized by the electric field produced by the charged cloud or by the lightning step leader, charged particles with the same polarity as the lightning step leader flow to the protected object 1 through the conducting wire 6 to diminish or neutralize the induced electric charge on the surface of the protected object 1, and then also decrease the electric field near the surface of the object 1 to a value which is lower than that needed for air to break down as a conductor.

Figure 2:
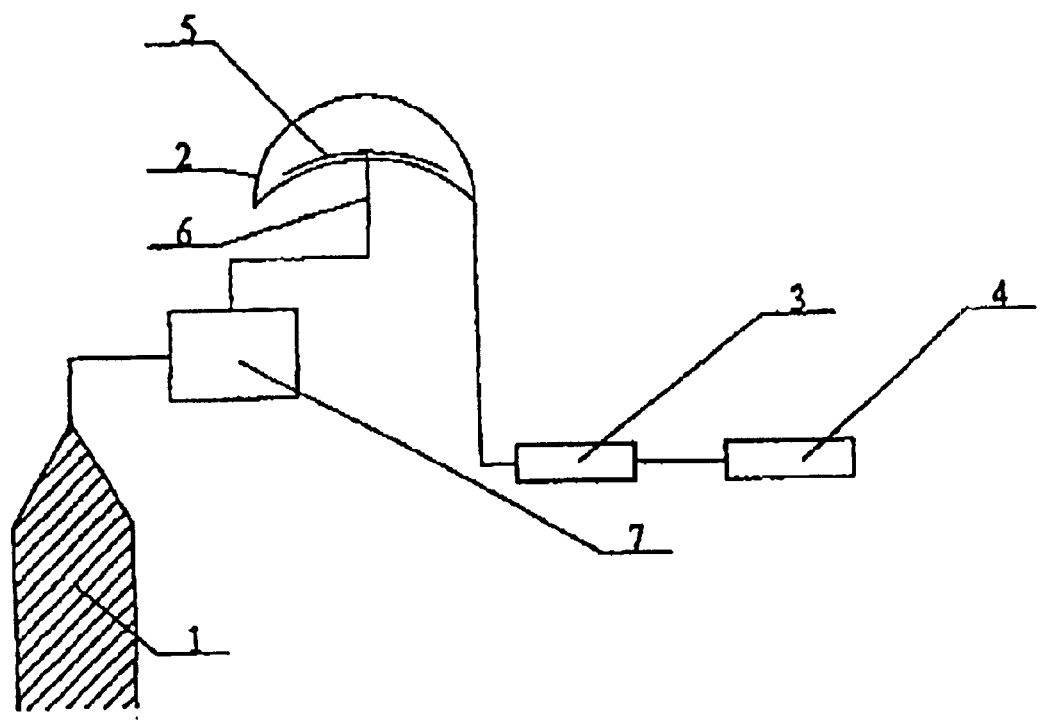
FIG. 2 is a block diagram of a lightning protection system that includes an amplifier, according to another embodiment of the invention.

As shown in FIG. 2, the area protected from a lightning strike can be increased by an amplifier 7, e.g., a high speed amplifier, that provides increased electrical current flow. The amplifier 7 may be connected in series between the holder 5 and the protected object 1, according to one embodiment of the invention.

Various embodiments of this invention may be implemented to protect a variety of objects. For example, this technique may be implemented in a radar antenna cover, according to one embodiment of the invention. Normally the cover of a conventional radar antenna protects the device from wind, rain, and snow but does not protect it from a lightning strike. The vacuum plasma holder 2 is formed to be the correct shape to serve as the cover of a radar antenna, according to one embodiment of the invention. In certain embodiments, the conducting wire 6 connects the metal conductor 5 located in the plasma holder 2 to the point of the radar that possess the highest induced charge from an electric field, usually the highest point of the radar. A power supply 4 provides the energy to the circuit 3 which generates vacuum plasma with a sufficient density of charged particles. The concentration of vacuum plasma is sufficiently produced in the plasma holder 2. When the plasma is polarized by the electric field produced by the electric charge from the charged cloud or the lightning step leader, charged particles with the same polarity as the lightning leader flow into the wire 6 and then flow into surface of the protected radar antenna to diminish or neutralize the induced electric charge on the surface of the protected radar antenna. This also assists in decreasing the charge of the electric field near the surface of the radar antenna, lowering the charge below the threshold where air may break down as an insulator. In order to increase the protected area of the radar antenna, a high speed electrical current amplifier may be connected in series between the plasma holder 2 and the protected radar antenna.

This invention may also be used to provide lightning protection for well known antenna structures such as dipole antennas, parabolic antennas and Yagi antennas with prominent conductor parts, according to other embodiments of this invention. Dipole antennas, parabolic antennas and Yagi antennas are usually positioned in high places relative to their surroundings and, consequently, are likely objects of a lightning strike. In one embodiment, the vacuum plasma holder 2 can be manufactured to be crescent shaped to cover prominent conductor parts of a dipole antenna, parabolic antenna and a Yagi antenna. The conducting wire 6 connects the metal conductor 5 to the highest point of the dipole antenna, parabolic antenna or Yagi antenna that possess the highest induced electric charge. The power supply 4 provides the energy to the circuit 3 which generates vacuum plasma with a sufficient density of charged particles to protect the antenna. When the plasma is polarized by the electric field produced by the electric charge of the lightning step leader, charged particles with the same polarity as the lightning step leader flow into the connecting wire 6 and then flow into the prominent surface of the dipole antenna, parabolic antenna and Yagi antenna to diminish or neutralize the induced electric charge on the surface of the protected radar antenna. This also assists in decreasing the charge of the electric field near the surface of the protected antenna, lowering the charge below the threshold where air may break down as an insulator.

There are several advantages of the present invention compared to the prior art. First, the present invention overcomes the disadvantage of the lightning rod which can not protect electronic devices inside the house. Also, generation of vacuum plasma is easy and the polarization of the vacuum plasma under the lightning electric field is also easy. Additionally, because vacuum plasma is transparent to radio frequency and microwave radiation, a plasma holder formed into a cover can protect an electrical device, such as a radar antenna, from environmental elements without interfering with the operation of radar and offer protection from a lightning strike.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of providing lightning protection by preventing lightning from hitting an object, comprising:

polarizing vacuum plasma under the influence of an induced electric field to provide charged particles with the same polarity as a lightning step leader to flow to the object thereby diminishing or neutralizing an electric field produced by an induced condition.

2. An apparatus for lightning protection using vacuum plasma, comprising:

a holder of plasma, wherein said holder of plasma is made of an insulating material with a substantially smooth inner surface and having a rather large curvature radius;

a conductor positioned proximate to or on a surface of said holder of plasma;

a circuit, wherein said circuit connects to the conductor so as to generate a plasma;

a conducting wire connecting the conductor to a protected object; and a power supply connected to the circuit.

3. The apparatus of claim 2, further comprising an amplifier connected in series between said holder of plasma and said protected object.

4. The apparatus of claim 3, wherein the amplifier is a high speed electrical current amplifier.

5. The apparatus of claim 2, wherein the conductor is a metal conductor.

6. A system for providing lightning protection by preventing lightning from hitting an object, comprising:

means for polarizing vacuum plasma under the influence of an induced electric field to provide charged particles with the same polarity as a lightning step leader to flow to the object thereby diminishing or neutralizing an electric field produced by an induced condition.

* * * * *